(12) United States Patent
Ye et al.

(10) Patent No.: US 8,931,615 B2
(45) Date of Patent: Jan. 13, 2015

(54) MODULAR CHAIN NEWEL WITH STANDARD BEARING

(75) Inventors: Ke Ye, Guangzhou (CN); Yanying Anne Chen, Guangzhou (CN); Coliu Wu, Guangzhou (CN); Shouhong Wang, Guangzhou (CN); Qingdong Jiang, Guangzhou (CN)

(73) Assignee: Otis Elevator Company, Farmington, CT (US)

( * ) Notice: Subject to any disclaimer, the term of this patent is extended or adjusted under 35 U.S.C. 154(b) by 441 days.

(21) Appl. No.: 13/255,736

(22) PCT Filed: Mar. 10, 2009

(86) PCT No.: PCT/IB2009/000470
§ 371 (c)(1),
(2), (4) Date: Sep. 9, 2011

(87) PCT Pub. No.: WO2010/103340
PCT Pub. Date: Sep. 16, 2010

(65) Prior Publication Data
US 2011/0315508 A1  Dec. 29, 2011

(51) Int. Cl.
*B66B 23/24* (2006.01)
*B66B 23/14* (2006.01)
*B65G 15/60* (2006.01)

(52) U.S. Cl.
CPC ............. *B66B 23/145* (2013.01); *B66B 23/147* (2013.01); *B65G 15/60* (2013.01); *B66B 23/24* (2013.01)
USPC .......................................... 198/335; 198/842

(58) Field of Classification Search
USPC .......... 198/321–338, 779, 837, 838; 193/35 F
See application file for complete search history.

(56) References Cited

U.S. PATENT DOCUMENTS

| 1,377,450 | A | * | 5/1921 | Whipple | 474/236 |
| 2,449,611 | A | * | 9/1948 | McSherry | 198/779 |
| 2,784,833 | A | * | 3/1957 | Heidinger | 198/683 |

(Continued)

FOREIGN PATENT DOCUMENTS

| JP | 03-095095 A | 4/1991 |
| JP | 2000-130517 A | 5/2000 |

(Continued)

OTHER PUBLICATIONS

English Translation of Chinese Second Office Action, issued Jul. 5, 2013.

(Continued)

*Primary Examiner* — William R Harp
(74) *Attorney, Agent, or Firm* — Cantor Colburn LLP (57) ABSTRACT

A roller bearing and newel guide assembly (30) for a newel (24) in an escalator (10) has a newel guide (32), a roller chain (34), and a spring (40) connected between the roller chain (34) and the newel guide (32) to provide tension to the roller chain (34). The roller chain (34) comprises a series of interlinked chain units (36). Each chain unit (36) includes a frame (78), at least one roller bearing (72), and a pin (76) for connecting the roller bearing (72) to the frame (78). Each chain unit (36) has a female connector (62) and a male connector (64), which allow each chain unit (36) to connect to an adjacent chain unit (36) to form the roller chain (34).

19 Claims, 7 Drawing Sheets

(56) References Cited

U.S. PATENT DOCUMENTS

| | | | | |
|---|---|---|---|---|
| 2,785,578 | A | * | 3/1957 | Nold .............................. 474/235 |
| 3,595,364 | A | | 7/1971 | Schoneweiss |
| 5,372,232 | A | * | 12/1994 | Ahls et al. ..................... 198/335 |
| 5,634,546 | A | * | 6/1997 | Ostermeier et al. .......... 198/335 |
| 5,638,937 | A | * | 6/1997 | Birney et al. ................. 198/335 |
| 7,543,696 | B2 | * | 6/2009 | Aulanko et al. .............. 198/329 |

FOREIGN PATENT DOCUMENTS

| | | |
|---|---|---|
| JP | 2003-252559 A | 9/2003 |
| JP | 2008184241 A | 8/2008 |
| SU | 563545 A | 6/1977 |
| SU | 1194831 A1 | 11/1985 |

OTHER PUBLICATIONS

Chinese Office Action mailed Feb. 17, 2013.
International Search Report, mailed Dec. 4, 2009.
English Translation of Russian Office Action.

* cited by examiner

MODULAR CHAIN NEWEL WITH STANDARD BEARING

BACKGROUND

Passenger conveyors, such as escalators and moving walkways, have a continuously looping pathway flanked by railings called balustrades. These balustrades have moving handrails that slide along the balustrade at the same speed as the continuously looping pathway. At the ends of the conveyors, the handrails typically pass over curved newels. The curvilinear profile of the newel makes it difficult to maintain tension in the handrail while minimizing friction. Solutions for moving the handrail over the curved newel have included using a large rotating wheel, such as a flywheel, or using a plurality of roller bearings along a curvilinear profile.

Where the roller bearing solution has been used, the roller bearings need to be maintained in contact with the handrail as the handrail moves over the curved newel. The roller bearings typically are retained in a newel guide that matches the profile of the curved newel. Each bearing is pinned into a hole drilled into the newel guide. These holes need to follow the curvilinear profile of the newel guide, which makes manufacturing these guides difficult. Because difficult manufacturing techniques are involved in constructing the roller bearing and newel guide assemblies, the quality of these assemblies often suffers. Furthermore, as a result of wear, contamination, and various other factors, roller bearings have a limited lifetime and eventually need to be replaced. When the bearings are replaced, the entire roller bearing and newel guide assembly must be removed and replaced. The removal and replacement of the damaged roller bearing and newel guide assembly is very expensive and inefficient, especially when only one roller bearing needs replacement.

SUMMARY

The present invention includes a handrail assembly for a newel of a passenger conveyor comprising, a handrail belt that travels around the newel, a roller bearing and newel guide assembly comprising a newel guide and a roller chain, and a spring connected between a first end of the roller chain and the newel guide to provide tension to the roller chain in order to maintain contact between the surface area of the roller and the handrail belt.

In one aspect, the invention includes a roller chain having a first end and a second end connected to the newel guide. The roller chain comprises a series of interlinked chain units, each chain unit being connected to an adjacent chain unit in the roller chain.

In another aspect, the invention includes an individual chain unit of the roller chain. Each chain unit includes a frame, at least one roller bearing that contacts the handrail belt, and a pin for connecting the roller bearing to the frame. The frame has a base and first and second side panels that extend upwardly from the base. The base of the frame has a male connector and a female connector, which allow each chain unit to connect to an adjacent chain unit. In one embodiment, these connectors are hook and loop connectors. Each roller bearing has an inner race and an outer race. The pin is inserted through a hole in the first side panel, the inner race of the roller bearing, and a hole in the second side panel to support the bearing within the frame.

In a further aspect, the invention includes a method for assembling and a method for repairing the roller bearing and newel guide assembly. To assemble the roller bearing and newel guide assembly, a first end of the roller chain, typically the end containing the spring, is connected to a first end of the newel guide with a first fastener. The roller chain is then aligned within the newel guide and force is applied to the chain to keep the spring in tension. The second end of the roller chain is then connected to the second end of the newel guide with a second fastener. To repair the roller bearing and newel guide assembly, the roller chain is first disconnected from the newel guide by removing a fastener from at least a first end of the roller chain. At least one damaged chain unit is then removed from the roller chain. This chain unit is replaced, and the repaired roller chain is connected to the newel guide with the fastener.

DETAILED DESCRIPTION

Figure 1:
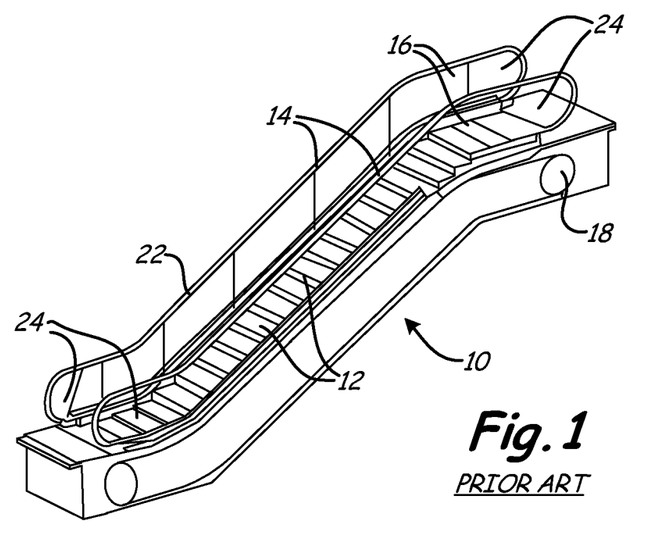
FIG. 1 is a perspective view of a passenger conveyor.

A passenger conveyor, such as escalator 10 shown in FIG. 1, includes a continuous loop of steps 12, a pair of handrails 14, a pair of balustrades 16 extending along the side of steps 12 from a first landing to a second landing, and a drive system 18. Drive system 18 is configured to drive steps 12 and handrails 14 at a constant speed and in synchrony with one another. Handrails 14 are slidingly engaged with handrail guide 22 disposed on the outer edge of each balustrade 16. Each end of balustrade 16 includes a rounded section that defines newel 24. Newel 24 extends beyond the exposed portion of steps 12 and provides a turn around section for reversing the direction of travel of handrail 14 for the return trip in the closed loop path through which handrail 14 travels. The newel 24 contains a roller bearing and newel guide assembly 30 (shown in FIG. 2) to enable the handrail 14 to pass around newel 24.

Figure 2:
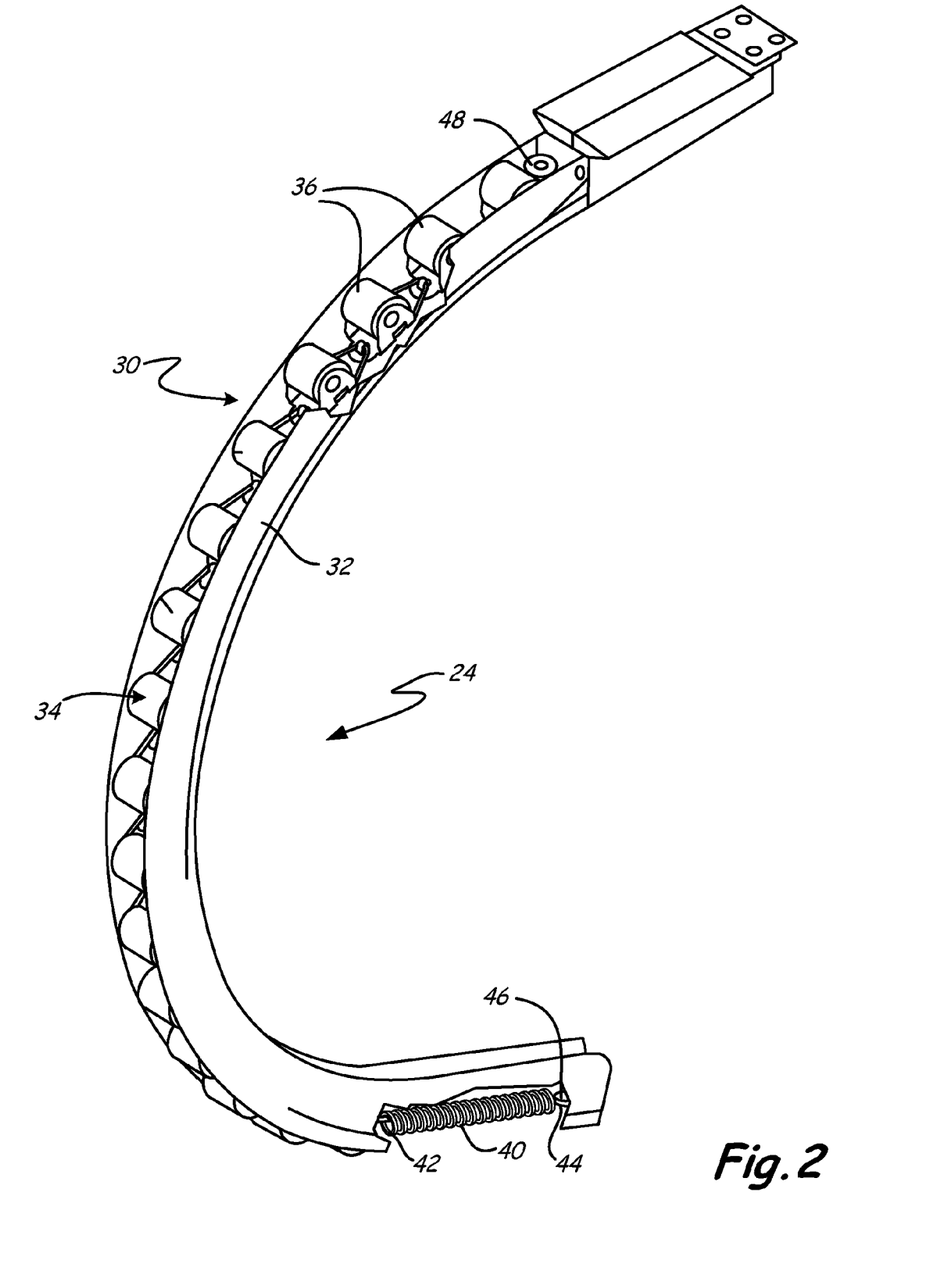
FIG. 2 is a perspective view of a roller bearing and guide assembly.

FIG. 2 shows a view of the roller bearing and newel guide assembly 30 of the present invention, having newel guide 32 and roller chain 34. Newel guide 32 has a curvilinear profile that mirrors the curvilinear profile of newel 24. Roller chain 34 includes a series of interlinked chain units 36. In order to maintain tension in roller chain 34, spring 40 has first end 42 that is attached to one end of roller chain 34 and second end 44 attached to one end of newel guide 32. Second end 44 is attached to newel guide 32 with fastener 46. Roller chain 34 is also attached to the other end of newel guide 32 with fastener 48.

Figure 3A:
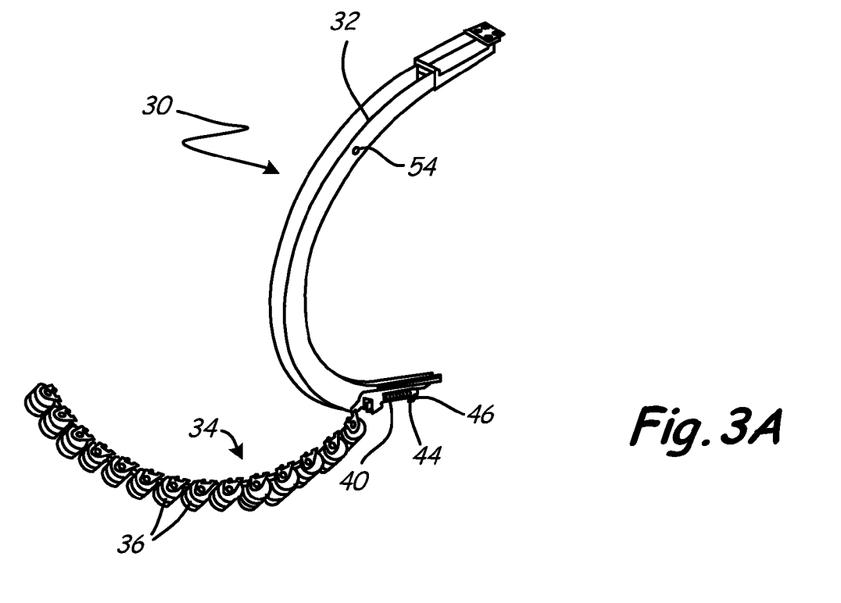
FIGS. 3A-3B are views of the installation of the roller bearing and guide assembly of FIG. 2.
Figure 3B:
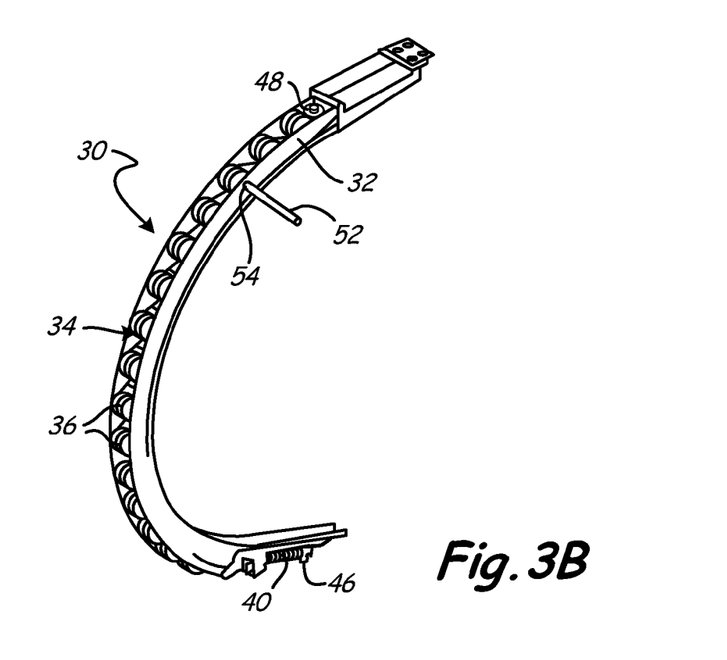

Due to the modular nature of roller chain 34, assembly and repair of the roller bearing and newel guide assembly 30 is simplified. FIGS. 3A and 3B show how roller chain 34 is assembled with newel guide 32 to form roller bearing and newel guide assembly 30. As mentioned above, second end 44 of spring 40 is joined at one end of newel guide 32 by fastener 46. Roller chain 34, which is connected to spring 40, is aligned with newel guide 32. Pin 52 is inserted into hole 54 which is pre-drilled within newel guide 32. Pin 52 allows tension in spring 40 to be maintained while roller chain 34 is fixed to newel guide 32 by fastener 48. To repair broken roller chain 34 (or even repair individual chain units 36 of roller chain 34), roller chain 34 is removed from newel guide 32 by releasing fasteners 46, 48. Repaired (or new) roller chain 34 can then be aligned with newel guide 32. Alternatively, at least one damaged chain unit 36 can be removed from the roller chain 34 and replaced with new chain unit 36 instead of using an entirely new roller chain 34.

Figure 4:
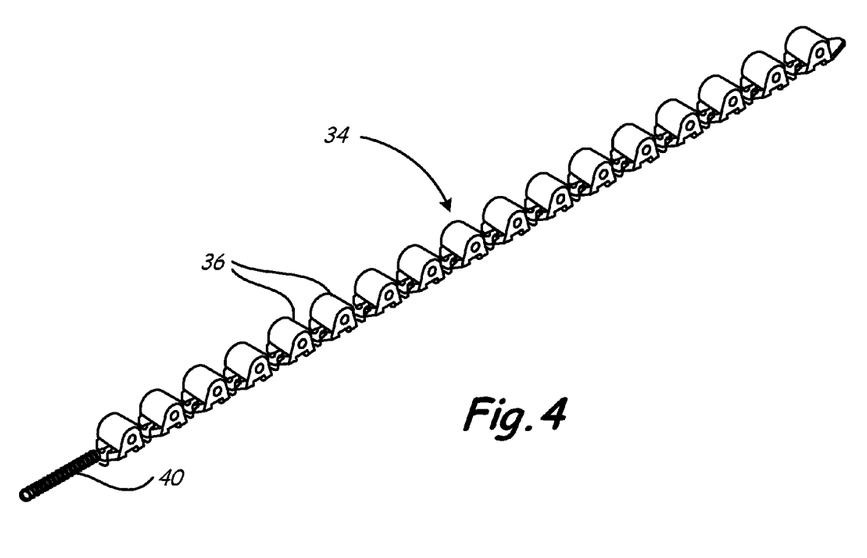
FIG. 4 is a view of the roller bearing chain from the roller bearing and guide assembly of FIG. 2.

FIG. 4 shows a view of roller chain 34 removed from newel guide 32. Roller chain 34 typically includes at least ten chain units 36. Preferably, roller chain 34 has between fifteen and twenty chain units 36. The length of roller chain 34 is long enough to cover a substantial portion of newel guide 32 (shown in FIGS. 2-3) within newel 24 (shown in FIGS. 1-3). The overall length of roller chain 34, not including spring 40, can range between 600 mm (23.62 in.) and 1200 mm (47.25 in.), depending on the number of chain units 36. Typically, the length of roller chain 34 is between 800 mm (31.49 in.) and 1100 mm (43.31 in.).

Figure 5:
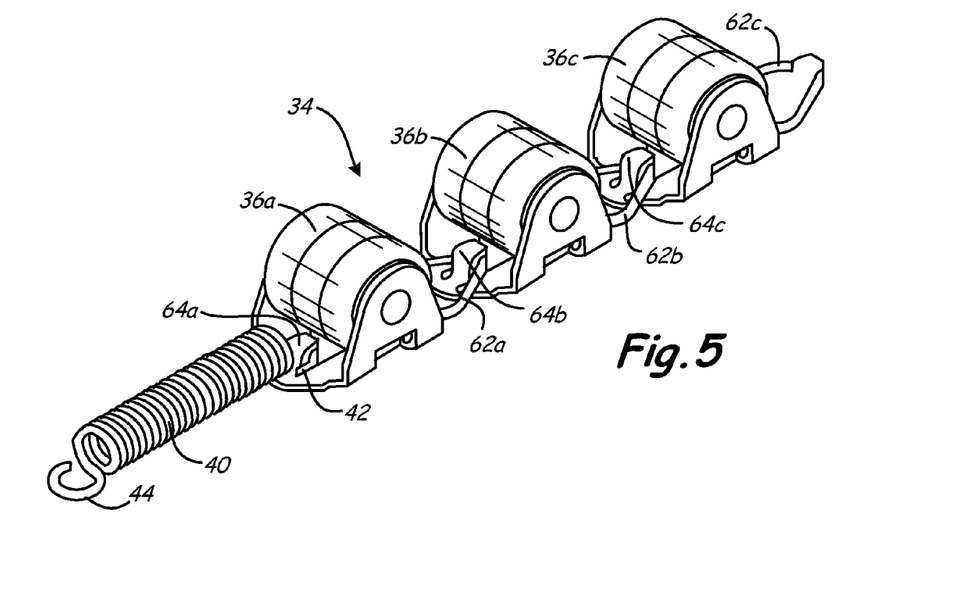
FIG. 5 is a view of a portion of the roller bearing chain of FIG. 4.

FIG. 5 shows a closer view of a portion of roller chain 34 shown in FIG. 4. As mentioned earlier, a series of interlinked chain units 36 forms roller chain 34. These chain units 36 are linked with each other using connectors 62, 64 in order to form roller chain 34. In the present embodiment, connector 62 is a loop and connector 64 is a hook. Other forms of connectors, such as ball and socket connectors and other male and female connectors, can also be used to form a mating connection between chain units 36. As shown in FIG. 5, chain unit 36a is connected to chain unit 36b by connecting loop 62a of chain unit 36a with hook 64b of chain unit 36b. Chain unit 36c is connected to chain unit 36b by connecting loop 62b of chain unit 36b with hook 64c of chain unit 36c. After a plurality of chain units 36a, 36b, 36c are connected to form roller chain 34, one end of roller chain 34 has free hook 64a, and the other end of roller chain 34 has free loop 62c. Spring 40 has first end 42 for connecting with roller chain 34 and second end 44 for connecting spring 40 to newel guide 32. In one embodiment, free hook 64a is connected to spring 40 at first end 42. However, it can be appreciated that spring 40 may instead be attached to free loop 62c.

Figure 6:
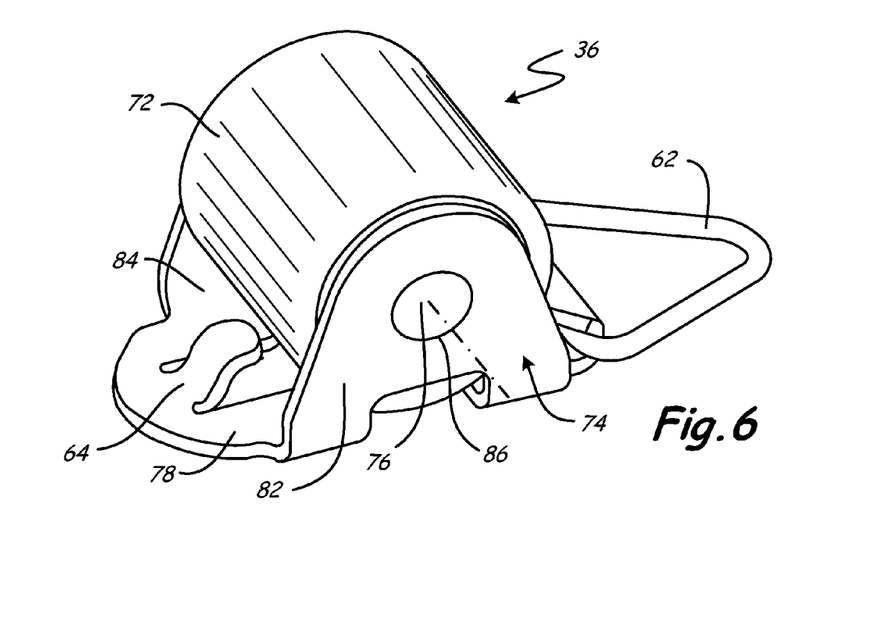
FIG. 6 is a view of a chain unit of the roller bearing chain of FIG. 4.

As shown in FIG. 6, each chain unit 36 comprises roller bearing 72 held within frame 74 by pin 76. Roller bearing 72 has an inner race and an outer race (shown in FIGS. 8A-8C). Roller bearing 72 is typically made from metals, but may also be made from plastic or other polymeric materials. Frame 74 has base 78 and two side panels 82, 84 extending upward from base 78. Side panels 82, 84 extend upward from base 78 at opposite sides of base 78. Side panel 82 is substantially parallel with side panel 84. Side panels 82, 84 each have holes 86, 88. Pin 76 is inserted through hole 86, inner race of roller bearing 72, and hole 88 to support roller bearing 72 within frame 74. Hook 64 is connected to base 78 at one end of base 78, and loop 62 is connected at the opposite end of base of 78. Connectors, such has loop 62 and hook 64, may be integrally formed with frame 74 or may be detachable from frame 74. In the illustrative embodiment, hook 64 is formed integrally with frame 74, while loop 62 is made separately and later connected to frame 74. Loop 62 be pivotally connected to frame 74 so that roller chain 34 can follow the curvilinear profile of newel guide 32.

The overall length of chain unit 36 can range from 30 mm (1.18 in.) to 60 mm (2.36 in.), preferably between 40 mm (1.57 in.) and 50 mm (1.97 in.). The overall height of chain unit 36 can range from 10 mm (0.39 in.) to 40 mm (1.57 in.), preferably between 20 mm (0.79 in.) and 30 mm (1.18 in.). The overall width of chain unit 36 can range from 10 mm (0.39 in.) to 40 mm (1.57 in.), preferably between 25 mm (0.98 in.) and 35 mm (1.38 in.).

Figure 7:
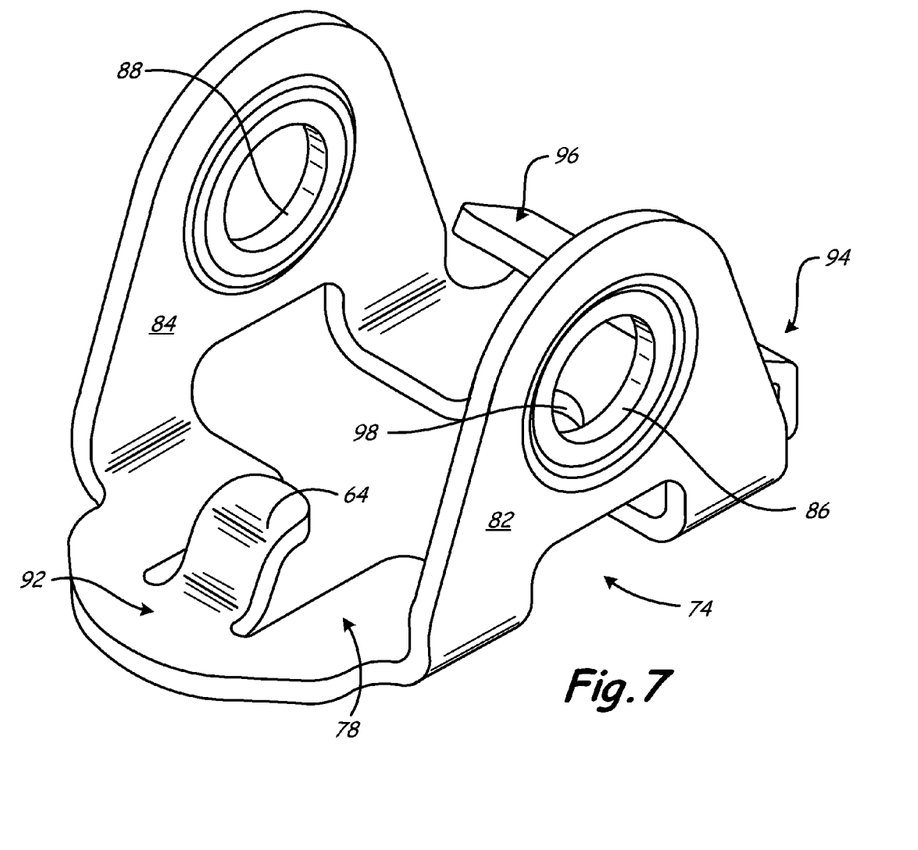
FIG. 7 is a view of a frame of the chain unit of FIG. 6.

FIG. 7 shows a detailed view of frame 74 of one embodiment. At first end 92 of base 78, hook 64 is integrally formed with base 78. First end 92 of base 78 may also have a radius as shown in FIG. 7. Second end 94 of base 78 forms turnback 96, which is used to secure loop 62 (not shown) to the frame while allowing loop 62 to be pivotally coupled to frame 74. The distance between hook 64 and turnback 96 allows for clearance for roller bearing 72. Base 78 may have a notch 98 which is centered between side panels 82, 84. The purpose of notch 98 is to properly position frame 74 during manufacture. As previously mentioned, side panels 82, 84 extend upward from base 78 and have holes 86, 88. Side panels 82, 84 are substantially parallel to one another, and are rounded along at least a portion of their perimeter. Holes 86, 88 are concentric. Frame 74, including base 78 and side panels 82, 84, may be made of any material, including polymers and metals. In one embodiment, frame 74 is made from sheet metal, such as stainless steel or aluminum. Frame 74 may be manufactured by stamping, molding, and other casting methods, as well as other forms of metalworking, including, for example, welding.

Figure 8A:
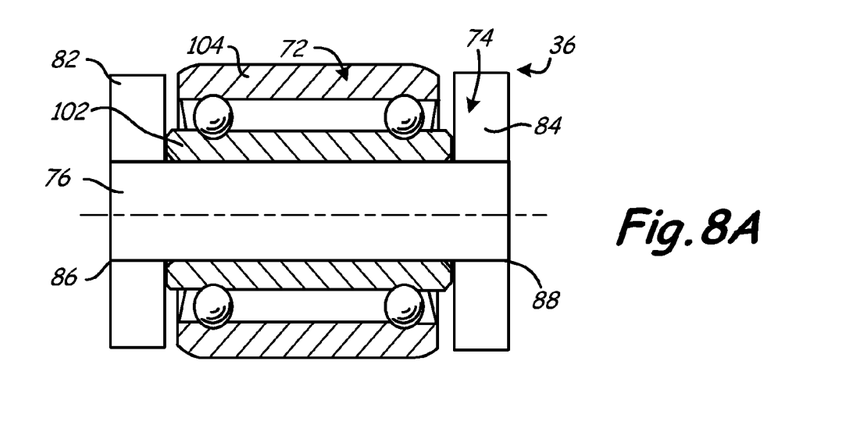
FIGS. 8A-8C are cross-sectional views of the chain unit of FIG. 6.
Figure 8B:
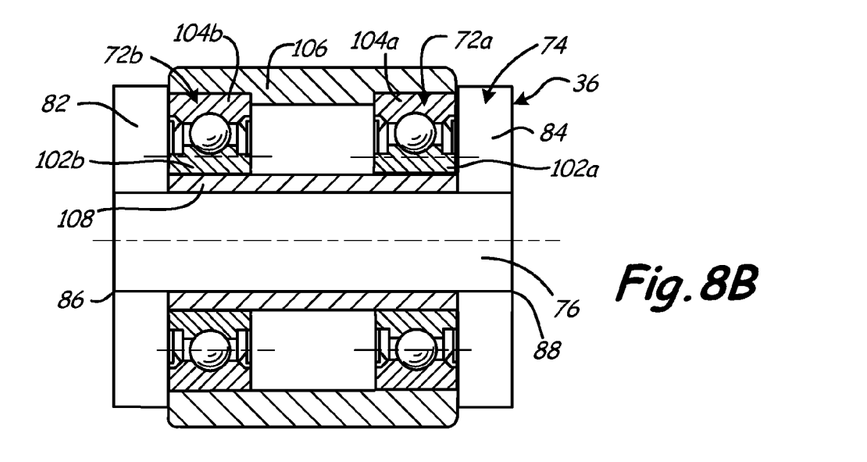
Figure 8C:
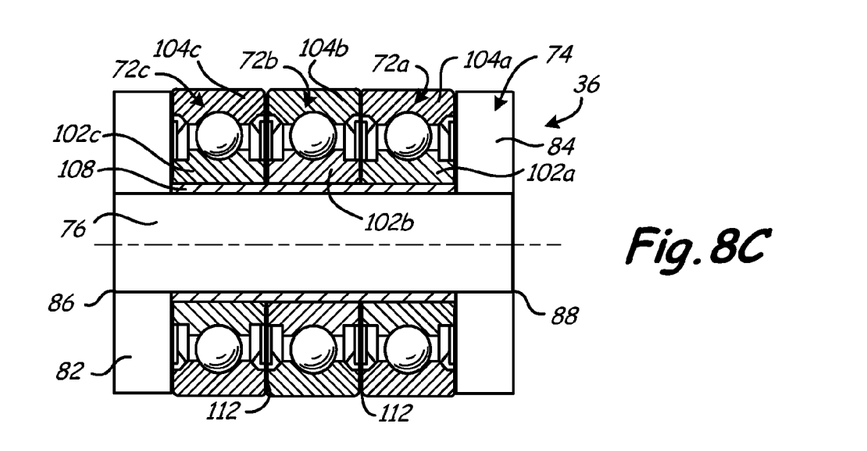

FIGS. 8A-8C show three embodiments of chain unit 36. It can be appreciated that other embodiments and configurations of the chain unit 36 may be used. Chain unit 36 may include a single roller bearing 72, as shown in FIG. 8A, or it may include a plurality of roller bearings 72a, 72b, 72c as shown in FIGS. 8B and 8C. Each roller bearing has an inner race 102 and an outer race 104.

In order to assemble chain unit 36 with single roller bearing 72, as shown in FIG. 8A, pin 76 is inserted through hole 86. Pin 76 then goes through inner race 102 and hole 88 to align roller bearing 72 within frame 74. Roller bearing 72 must be wide enough to maintain required contact between roller bearing 72 and handrail 14.

Where chain unit 36 has two roller bearings 72a, 72b, pin 76 goes through the inner race 102a, 102b of roller bearings 72a, 72b as shown in FIG. 8B. A roller shell 106 substantially surrounds the outer races 104a, 104b or roller bearings 72a, 72b in order to cover them. Roller shell 106 maintains the proper width of roller bearing 72a, 72b in order to have the necessary surface contact between roller bearing 72a, 72b and handrail 14. Bushing 108 may be inserted between pin 76 and inner races 102a, 102b of roller bearings 72a, 72b.

Where chain unit 36 has three roller bearings 72a, 72b, 72c, bushing 108 again may be inserted between pin 76 and inner races 102a, 102b, 102c of roller bearings 72a, 72b, 72c as shown in FIG. 8C. In the illustrative embodiment, bushing 108 is made from a plastic material. However, bushing 108 could also be made from metals (such as stainless steel and aluminum). In some embodiments, shims 112 are inserted between the roller bearings 72a, 72b, 72c. Shims 112 may be made from metals or polymers.

Although the present invention has been described with reference to particular embodiments, workers skilled in the art will recognize that changes may be made in form and detail without departing from the spirit and scope of the invention.

The invention claimed is:
1. A handrail assembly for a newel of a passenger conveyor, the assembly comprising:
 a handrail belt that travels around the newel;
 a newel guide;
 a roller chain having a first end and a second end connected to the newel guide, the roller chain comprising a series of interlinked chain units that are each separately removable from the roller chain, wherein each chain unit comprises:
a frame having a first end and a second end;
a hook at the first end;
a loop at the second end; and
a roller bearing mounted between the first end and the second end;
wherein the chain units are connected by engagement of the hook of one of the chain units with the loop of an adjacent chain unit; and
a spring connected between the first end of the roller chain and the newel guide to provide tension to the roller chain in order to maintain contact between the roller bearings and the handrail belt;
wherein the hook is integrally formed with the frame of each chain unit, and the loop is a separate piece that can be connected to the frame of each chain unit.

2. The assembly of claim 1, wherein the second end of the roller chain is connected to the newel guide by a fastener.

3. The assembly of claim 1, wherein the hook extends upward from a base of the frame towards the roller bearing.

4. The assembly of claim 1, wherein the loop is pivotable in the frame.

5. A chain for use in a newel of a passenger conveyor, the chain comprising:
a plurality of chain units, each chain unit having a hook connector at one end and a loop connector at an opposite end, the chain units being detachably linked together in series by engagement of the loop connector of one chain unit with the hook connector of an adjacent chain unit;
wherein each chain unit comprises a frame having a first end and a second end, and at least one roller bearing supported by the frame, and wherein the hook connector is adjacent a first end of the frame and the loop connector is adjacent a second end of the frame;
wherein the hook connector is integrally formed in a base portion of the frame and the loop connector is a separate piece pivotally connected to the frame.

6. The chain of claim 5, wherein the hook connector extends upward from a base of the frame.

7. A chain for use in a newel of a passenger conveyor, the chain comprising:
a plurality of chain units, each chain unit having a hook connector at one end and a loop connector at an opposite end, the chain units being detachably linked together in series by engagement of the loop connector of one chain unit with the hook connector of an adjacent chain unit;
wherein each chain unit comprises a frame having a first end and a second end, and at least one roller bearing supported by the frame, and wherein the hook connector is adjacent a first end of the frame and the loop connector is adjacent a second end of the frame; and
a spring connected to an end of the plurality of chain units.

8. A chain unit for use in the newel of a passenger conveyor, the chain unit comprising:
a frame comprising a base having a hook adjacent a first end of the base and extending upward from the base, a loop pivotally coupled to a second end of the base, a first side panel extending upward from the base, and a second side panel extending upward from the base; and
at least one roller bearing supported between the first side panel and the second side panel.

9. The chain unit of claim 8, and further comprising:
a pin inserted through the first side panel, an inner race of the roller bearing, and the second side panel to support the roller bearing within the frame.

10. The chain unit of claim 9, and further comprising:
a bushing inserted between the inner race of the bearing and the pin.

11. The chain unit of claim 8, and further comprising:
a shim separating a first roller bearing from a second roller bearing.

12. The chain unit of claim 8, and further comprising:
a shell surrounding the outer race of the roller bearing.

13. The chain unit of claim 8, wherein the base of the frame includes a turnback that supports the loop.

14. The chain unit of claim 8, wherein the hook is integrally formed with the base of the frame.

15. A method for assembling a roller chain and a newel guide used in a newel of an escalator, the method comprising:
connecting a first end of the roller chain to a first end of the newel guide with a first fastener, the first end of the roller chain having a spring;
aligning the roller chain within the newel guide;
applying tension to the chain to keep the spring in tension;
placing a pin through a hole in the newel guide and into the roller chain; and
connecting a second end of the roller chain to the second end of the newel guide with a second fastener.

16. The method of claim 15, wherein the pin holds the roller chain in a fixed position relative to the newel guide to maintain tension in the spring.

17. A method for repairing a roller chain used in a newel of an escalator, the method comprising:
disconnecting a first end of the roller chain from a first end of a newel guide in the escalator by removing a fastener from at least a first end of the roller chain;
removing a damaged chain unit in the roller chain, the damaged chain unit being individually detachable from adjacent chain units, wherein each individual chain unit includes a frame with a hook at a first end of the frame, a loop at a second end of the frame, and a roller bearing mounted between the first end and the second end of the frame;
attaching a replacement chain unit to form a repaired roller chain; and
re-connecting the repaired roller chain to the newel guide.

18. The method of claim 17, wherein the damaged chain unit is removed from the roller chain by disconnecting the hook at the first end of the damaged chain unit from a loop on a first adjacent chain unit, and by disconnecting the loop at the second end of the damaged chain unit from a hook on a second adjacent chain unit.

19. The method of claim 17, wherein the loop is pivotable in the frame.

* * * * *